US010699301B2

(12) United States Patent
Zheng

(10) Patent No.: US 10,699,301 B2
(45) Date of Patent: Jun. 30, 2020

(54) DATA-PROCESSING METHOD AND APPARATUS, AND COMPUTER STORAGE MEDIUM FOR ELECTRONIC RESOURCE TRANSFER

(71) Applicant: TENCENT TECHNOLOGY (SHENZHEN) COMPANY LIMITED, Shenzhen (CN)

(72) Inventor: Wenxiao Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/206,436

(22) Filed: Nov. 30, 2018

(65) Prior Publication Data

US 2019/0095950 A1    Mar. 28, 2019

Related U.S. Application Data

(63) Continuation of application No. PCT/CN2017/090649, filed on Jun. 28, 2017.

(30) Foreign Application Priority Data

Jul. 1, 2016   (CN) .......................... 2016 1 0519161

(51) Int. Cl.
*G06Q 30/02* (2012.01)
*H04L 29/08* (2006.01)
(Continued)

(52) U.S. Cl.
CPC ....... *G06Q 30/0255* (2013.01); *G06F 16/906* (2019.01); *G06F 40/247* (2020.01);
(Continued)

(58) Field of Classification Search
CPC .......... G06Q 30/0255; G06Q 30/0217; G06Q 30/0208; G06Q 30/0207; G06Q 30/0277;
(Continued)

(56) References Cited

U.S. PATENT DOCUMENTS 9,026,537 B1 *   5/2015   Asgekar ................ G06F 16/285
                                           707/737
9,367,603 B2 *   6/2016   Keng ..................... G06F 16/285
(Continued)

FOREIGN PATENT DOCUMENTS

| CN | 103973769 | 8/2014 |
|---|---|---|
| CN | 105427135 | 3/2016 |
| CN | 106097023 | 11/2016 |

OTHER PUBLICATIONS

International Search Report dated Sep. 11, 2017 in PCT/CN2017/090649 filed Jun. 28, 2017. (With English Translation).
(Continued)

*Primary Examiner* — Jimmy H Tran
(74) *Attorney, Agent, or Firm* — Oblon, McClelland, Maier & Neustadt, L.L.P.

(57) ABSTRACT

A data-processing method and apparatus for remunerating and incentivizing user/consumer behavior with an electronic resource is discussed. A server allows a provider (e.g., an advertiser or first user) to incentivize interactions and behavior of users in a friend cluster on a webpage. The behavior includes, e.g., watching advertising media, sharing, voting, and commenting on the webpage. An electronic-resource attribute represents a quota/amount of the electronic resource allocated to incentivize certain behaviors and a mapping to relate disbursement amounts of the electronic resource with the behaviors. The electronic-resource attribute in the webpage is set, the users' terminals are caused to receive a resource message, and, in response, an electronic-resource request representing behavior data on the web page
(Continued)

by the users is transmitted. The amount of electronic resource transferred into the users' accounts is based on mapping the transmitted behavior data to a corresponding amounts of the electronic resource.

21 Claims, 7 Drawing Sheets

(51) Int. Cl.
*H04L 12/58* (2006.01)
*G06F 40/247* (2020.01)
*G06F 16/906* (2019.01)

(52) U.S. Cl.
CPC ..... *G06Q 30/0207* (2013.01); *G06Q 30/0208* (2013.01); *G06Q 30/0217* (2013.01); *G06Q 30/0277* (2013.01); *H04L 51/04* (2013.01); *H04L 67/20* (2013.01); *H04L 67/22* (2013.01)

(58) Field of Classification Search
CPC .......... G06Q 30/0253; G06Q 30/0222; G06Q 30/0212; H04L 51/04; H04L 67/20; H04L 67/22; G06F 17/2795; G06F 16/906
See application file for complete search history.

(56) References Cited

U.S. PATENT DOCUMENTS

| | | | |
|---|---|---|---|
| 9,521,252 B2* | 12/2016 | Leeds | H04M 3/02 |
| 9,525,753 B2* | 12/2016 | Shah | H04L 67/306 |
| 9,832,150 B2* | 11/2017 | Whitnah | G06Q 10/10 |
| 9,836,517 B2* | 12/2017 | Presta | G06F 16/278 |
| 9,846,916 B2* | 12/2017 | Juan | G06Q 50/01 |
| 10,097,947 B2* | 10/2018 | von Cavallar | G06F 16/29 |
| 10,217,117 B2* | 2/2019 | Heath | G06Q 30/02 |
| 10,348,798 B2* | 7/2019 | Tal | G06Q 50/01 |
| 10,375,236 B1* | 8/2019 | Leeds | G06Q 30/0241 |
| 10,389,664 B2* | 8/2019 | Whitnah | G06F 16/24578 |
| 10,482,487 B1* | 11/2019 | Zheleva | G06Q 30/0214 |
| 2010/0049852 A1* | 2/2010 | Whitnah | G06Q 10/10 |
| | | | 709/226 |
| 2010/0205024 A1* | 8/2010 | Shachar | G06Q 30/02 |
| | | | 705/7.33 |
| 2011/0208822 A1* | 8/2011 | Rathod | G06F 16/9535 |
| | | | 709/206 |
| 2012/0011212 A1* | 1/2012 | He | G06Q 10/10 |
| | | | 709/206 |
| 2012/0143675 A1* | 6/2012 | Aviv | G06Q 30/0245 |
| | | | 705/14.44 |
| 2013/0013682 A1* | 1/2013 | Juan | G06Q 50/01 |
| | | | 709/204 |
| 2013/0073473 A1* | 3/2013 | Heath | G06Q 30/02 |
| | | | 705/319 |
| 2013/0138479 A1* | 5/2013 | Mohan | G06Q 10/10 |
| | | | 705/7.33 |
| 2013/0290109 A1* | 10/2013 | Jamal | G06Q 50/01 |
| | | | 705/14.66 |
| 2014/0108537 A1* | 4/2014 | Crawford | H04L 67/24 |
| | | | 709/204 |
| 2014/0171039 A1* | 6/2014 | Bjontegard | H04W 4/029 |
| | | | 455/414.1 |
| 2014/0177813 A1* | 6/2014 | Leeds | H04M 3/02 |
| | | | 379/67.1 |
| 2015/0100574 A1* | 4/2015 | Presta | G06F 16/278 |
| | | | 707/737 |
| 2015/0127653 A1* | 5/2015 | Keng | G06F 16/285 |
| | | | 707/740 |
| 2016/0234302 A1* | 8/2016 | Wu | G06Q 50/01 |
| 2017/0054819 A1* | 2/2017 | Huffaker | H04L 67/22 |
| 2017/0146351 A1* | 5/2017 | von Cavallar | G06F 16/29 |
| 2017/0255681 A1* | 9/2017 | Giunio-Zorkin | G06F 16/24573 |
| 2018/0013846 A1* | 1/2018 | Lu | H04L 51/32 |
| 2018/0034758 A1* | 2/2018 | Whitnah | G06Q 10/10 |
| 2018/0035938 A1* | 2/2018 | el Kaliouby | G16H 40/63 |
| 2018/0204125 A1* | 7/2018 | Cavalin | H04L 67/22 |
| 2018/0246975 A1* | 8/2018 | Zheng | G06F 16/958 |
| 2018/0359288 A1* | 12/2018 | Wang | G06Q 30/0207 |
| 2019/0026285 A1* | 1/2019 | Himel | G06F 16/9024 |
| 2019/0052701 A1* | 2/2019 | Rathod | H04L 67/10 |

OTHER PUBLICATIONS

Written Opinion dated Sep. 11, 2017 in PCT/CN2017/090649 filed Jun. 28, 2017. (With English Translation).

* cited by examiner

DATA-PROCESSING METHOD AND APPARATUS, AND COMPUTER STORAGE MEDIUM FOR ELECTRONIC RESOURCE TRANSFER

RELATED APPLICATION

This application is a continuation of International Application No. PCT/CN2017/090649, filed on, Jun. 28, 2017, which claims priority to Chinese Patent Application with Application No. 201610519161.0 filed on Jul. 1, 2016, which are incorporated by reference in their entirety.

FIELD OF THE TECHNOLOGY

The present disclosure relates to the field of Internet technologies, and in particular, to a data-processing method and apparatus, and a non-transitory computer storage medium.

BACKGROUND OF THE DISCLOSURE

With the rapid development of Internet technologies, various service implementations are developed. For example, a virtual product in a form of "a package" is used for interaction, and a third party server can provide an electronic package function to advertise and propagate a brand. The virtual product is referred to as a merchant package. A merchant can generate package data and output the data to a user. The user can obtain an electronic package by scanning a QR code including the package, by tapping a link including the package, or by using another method. The merchant package provides only a behavior in which the user obtains the electronic package. Consequently, the interactivity between the merchant and the user is lacking.

SUMMARY

Embodiments of the present disclosure provide a data-processing method and apparatus, and a non-transitory computer storage medium, to allocate a corresponding electronic resource according to behavior data, thereby increasing the interactivity between a first user and a second user.

To resolve the foregoing technical problem, an embodiment of the present disclosure provides a data-processing method. In the method, in a web page of a friend cluster, an electronic-resource attribute is set that causes a resource message to be generated, the electronic-resource attribute including a total quota of an electronic resource and a mapping between an amount of the electronic resource and at least one type of behavior data. The resource message is sent to a first terminal of a first user, the first user having a first identifier. An electronic-resource request for a second user that uses the second terminal to obtain the electronic resource is received from a second terminal for the web page, the electronic-resource request including the first identifier, a second identifier of the second user, and behavior data, and the behavior data being generated based on an operation on the web page performed by the second user. the amount of the electronic resource corresponding to the behavior data of the electronic-resource request is determined by processing circuitry of an information processing apparatus and in accordance with the mapping between the amount of the electronic resource and the at least one type of behavior data. The determined amount of the electronic resource corresponding to the behavior data is transferred from an associated account of the first identifier to an associated account of the second identifier.

An embodiment of the present disclosure further provides a data-processing apparatus. The data-processing apparatus includes processing circuitry that sets, in a web page of a friend cluster, an electronic-resource attribute that causes a resource message to be generated, the electronic-resource attribute comprising a total quota of an electronic resource and a mapping between an amount of the electronic resource and at least one type of behavior data, sends the resource message to a first terminal of a first user, the first user having a first identifier, receives, from a second terminal for the web page, an electronic-resource request for a second user that uses the second terminal to obtain the electronic resource, the electronic-resource request comprising the first identifier, a second identifier of the second user, and behavior data, and the behavior data being generated based on an operation on the web page performed by the second user, determines, in accordance with the mapping between the amount of the electronic resource and the at least one type of behavior data, the amount of the electronic resource corresponding to the behavior data of the electronic-resource request, and transfers, from an associated account of the first identifier to an associated account of the second identifier, the determined amount of the electronic resource corresponding to the behavior data.

An embodiment of the present disclosure further provides a non-transitory computer storage medium, the non-transitory computer storage medium storing a computer executable instruction, and the computer executable instruction being used for performing the data-processing method described in the embodiments.

According to the data-processing method and apparatus, and the non-transitory computer storage medium in the embodiments of the present disclosure, an electronic-resource attribute is set for a web page for a friend cluster, to generate a resource message. The resource message is sent to a first terminal on which a first user having a first identifier is located, where the electronic-resource attribute can include a total quota of an electronic resource and an electronic resource corresponding to at least one type of behavior data. An electronic resource obtaining request generated by a second terminal for the web page is received, where the electronic resource obtaining request can include the first identifier, a second identifier, and behavior data, and the behavior data is generated when the second terminal detects that a second user corresponding to the second identifier performs an operation on the web page; the electronic resource corresponding to the behavior data can be determined according to the electronic resource obtaining request. The electronic resource corresponding to the behavior data in an associated account of the first identifier is transferred to an associated account of the second identifier. According to the embodiments of the present disclosure, a corresponding electronic resource can be allocated according to behavior data of a user, thereby increasing the interactivity between the first user and the second user.

BRIEF DESCRIPTION OF THE DRAWINGS

To describe the technical solutions in the embodiments of the present disclosure or in the related technology more clearly, the following briefly describes the accompanying drawings required for describing the embodiments or the related technology. The accompanying drawings in the following disclosure provide non-limiting examples, and varia

DESCRIPTION OF EMBODIMENTS

Figure 1:
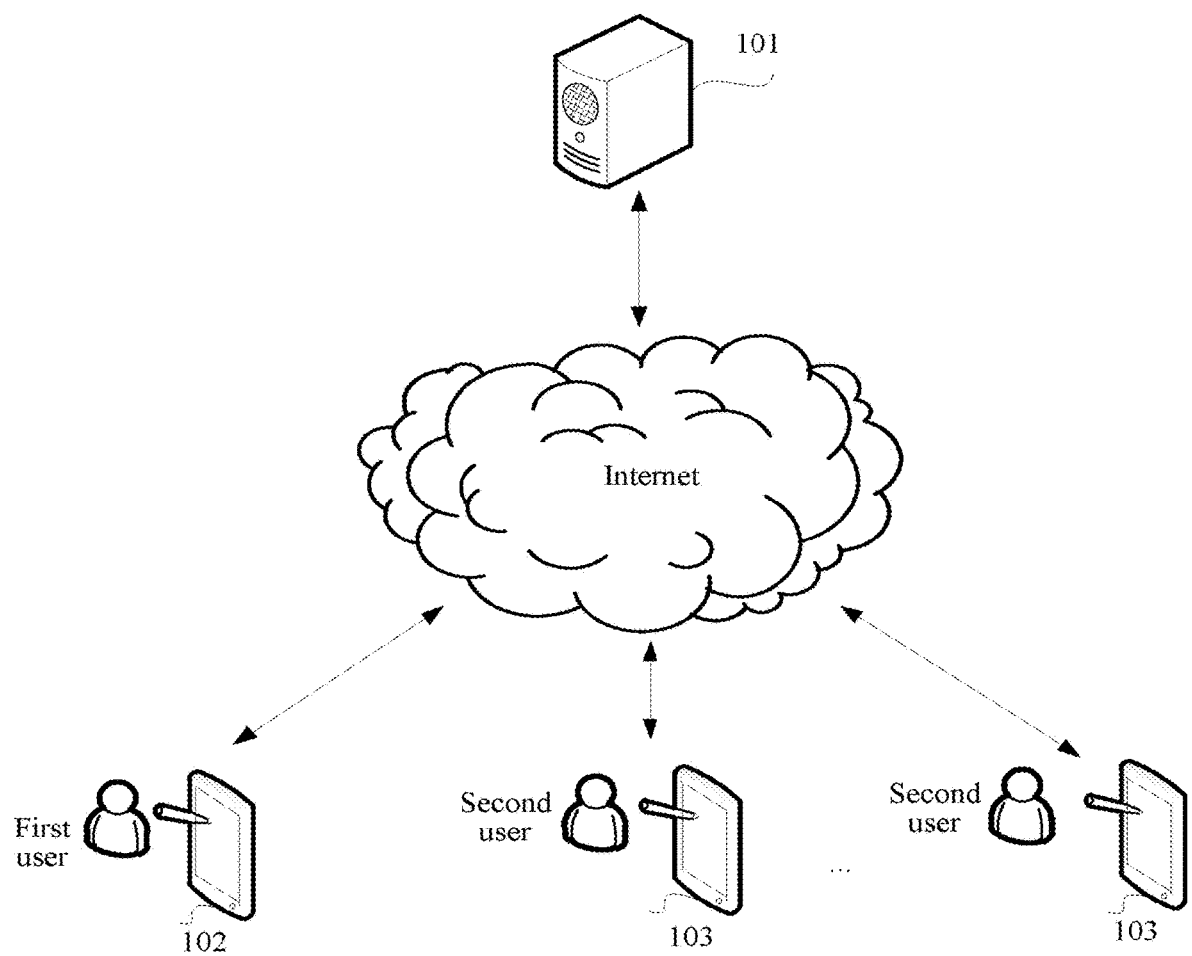
- FIG. 1 is a schematic architectural diagram of a data-processing system according to an embodiment of the present disclosure.

The following clearly describes the technical solutions in the embodiments of the present disclosure with reference to the accompanying drawings in the embodiments of the present disclosure. The non-limiting examples provided herein are provided to illustrate the disclosure, and variations of the non-limiting examples can be implemented without departing from the spirit of the disclosure as would be understood by a person of ordinary skill in the art.

Embodiments of the present disclosure provide a data-processing method. An electronic-resource attribute can be set for a web page for a friend cluster, to generate a resource message. The resource message can be sent to a first user corresponding to a first identifier, where the electronic-resource attribute can include a total quota of an electronic resource and an electronic resource corresponding to at least one type of behavior data. An electronic resource obtaining request generated by a terminal for the web page is received, where the electronic resource obtaining request can include the first identifier, a second identifier, and behavior data, and the behavior data can be generated when the terminal detects that a second user corresponding to the second identifier performs an operation on the web page. The electronic resource corresponding to the behavior data can be determined according to the electronic resource obtaining request. The electronic resource corresponding to the behavior data in an associated account of the first identifier can be transferred to an associated account of the second identifier, so that the corresponding electronic resource can be allocated according to the behavior data, thereby increasing the interactivity between the first user and the second user.

The data-processing method can be applied in a server. The server can be an independent service device in the Internet, or can be a cluster service device including multiple service devices in the Internet. The server can be configured to process various demands of Internet application in a process of implementing functions such as: (i) user registration, (ii) data configuration, and (iii) information exchange. The server can be configured to manage relevant data of a user and an interaction message between a user and another user in the Internet application. The relevant information of a user can include, but is not limited to, an identifier, a password, a relationship chain, and the like. For instance, the server can be an instant messaging server, a social networking services (SNS) server, or the like. The instant messaging server can include a WeChat server, a QQ server, a Facebook server, or the like.

The server can establish communication connection with at least one terminal. The terminal can include a tablet computer, a phone, a personal computer (PC), or the like. At least one type of Internet application can run in the terminal, and includes, but is not limited to, an instant messaging application, an SNS application, and the like. A user can use an Internet application by using the terminal. For example, the user can perform registration and obtain an identifier in the Internet application by using the terminal; or the user can configure personal data in the Internet application by using the terminal, where the personal data can include an age, a hobby, a consumption habit, and the like; or the user can interact with another user in the Internet application by using the terminal. For instance, the first user logging into the friend cluster by using the first identifier in a first terminal can be a merchant providing services, and is not limited to an advertiser. The second user, who uses the second terminal to log into the friend cluster by using the second identifier, can be a human user. The second user is, however, not limited to the exemplary and non-limiting embodiments of the present disclosure.

The friend cluster can be used for associating friends on a relationship chain. For example, the first user on the relationship chain can use the friend cluster to share personal data, an instant message, or the like with another friend on the relationship chain. The friend cluster can include Moments, Weibo, QQ space, or the like, and is not limited to the embodiments of the present disclosure.

For example, the first user logs into WeChat by using the first identifier, and publishes a web page link in Moments. The second user logs into WeChat by using the second identifier. The second user searches Moments for the first identifier of the first user to view the web page link published by the first user.

For another example, the first user logs into WeChat by using the first identifier. The first user enters a receiving contact of the web page. The receiving contact can include the second user, such that the first user can send the web page link to the second user by using Moments. The web page link can be a complete web page link, or can be a part of web page link corresponding to a complete web page link, or can be another display content such as a picture including a complete web page link.

A user in an Internet application corresponds to a unique identifier (for example, an account identifier). The user in the Internet application can include an enterprise user or a human user. Currently, most Internet applications support a function of issuing an electronic package, and not only support an enterprise user to send a resource message to a human user, but also support sending a resource message between human users. A resource message is a message that has a blessing function and that can be transmitted by using the Internet. The resource message can include, but is not limited to, a text message and/or a video message. The resource message can include electronic discount information such as a gift money packet, a coupon, a shopping voucher, or a point. A resource message usually includes an electronic-resource attribute.

An electronic resource herein can also be referred to as an electronic currency, which is stored in an electronic account. The electronic currency is different from paper money, and can be transmitted and used on the Internet.

The electronic resource can include an amount of an electronic gift money packet, a discount amount, a discount, a shopping amount, a point quota, and the like. An associated account can include, but is not limited to, an electronic bank account, an electronic financial account, an electronic credit account, or the like. The electronic-resource attribute included in the resource message can include a total quota of the electronic resource and an electronic resource corresponding to behavior data. For example, the electronic-resource attribute of a resource message describes that a total quota of its electronic resource can be 10 RMB, an electronic resource corresponding to first behavior data can be 2 RMB, and an electronic resource corresponding to second behavior data can be 3 RMB. As a result, it indicates that, for the resource message, the total quota of the electronic resource allowed to be collected can be 10 RMB, and electronic resources having different quotas can be collected by performing different operations on the web page.

Figure 3A:
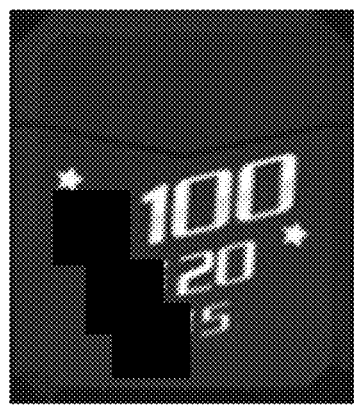
FIG. 3A is a schematic interface diagram of a user interface according to an embodiment of the present disclosure.
Figure 3B:
FIG. 3B is a schematic interface diagram of a user interface according to another embodiment of the present disclosure.

The web page can include information for advertising a merchant, for example, a text, an image, an audio, or a video. In an implementation, the web page can further include a preset user interface. The preset user interface can be configured to remind the user to perform an operation on the web page, to collect a corresponding electronic resource. For example, FIG. 3B is a schematic interface diagram of a user interface, and the preset user interface can be a coupon. The server can set a total quota of an electronic resource for a web page including the coupon, and an electronic resource corresponding to at least one type of behavior data.

Currently, an implementation architecture of the electronic gift money packet function of the Internet application involves only a provider and a receiver of the electronic gift money packet. For example, an enterprise user sends a gift money packet to a human user. The enterprise user provides a target message, where the target information can include an electronic-resource attribute. After the target message can be transmitted to a target user, the target user requests to collect an electronic resource by tapping the target. A corresponding electronic resource can be transferred from an associated account of the enterprise user (the provider) to an associated account of the target user (the receiver).

In related methods, such propagation processing process of a gift money packet message suffers from including only a single action by a second user, and, consequently, a propagation strength of the gift money packet message is relatively weak.

In contrast, for an implementation architecture of the gift money packet function provided herein, a corresponding electronic resource is allocated according to an operation performed by a user on a web page based on an existing situation, and, therefore, increases the propagation strength of the web page while also improving the practicability and interest of a data-processing process. For example, the enterprise user sends the gift money packet to the human user. The enterprise user publishes the web page to the human user rather than directly sending the gift money packet to the human user. The human user performs an operation on the web page, for example, browsing the web page, making a comment on the web page, voting, or sharing. The server can allocate a corresponding electronic resource according to an interactivity between the human user and the enterprise user, to increase the interactivity between the enterprise user and the human user, effectively increase the propagation strength of a brand, enrich functions of the data-processing process, and improve the practicability and interest of the data-processing process.

Referring to FIG. 1, FIG. 1 is a schematic architectural diagram of a data-processing system according to an embodiment of the present disclosure. As shown in FIG. 1, the data-processing system can include a server 101, a first terminal 102, and at least a second terminal 103. The first terminal 102 and the at least one second terminal 103 can be connected to the server 101 by using the Internet.

The first terminal 102 can be configured to: generate a web page for a friend cluster, and send, to the server 101, the web page, a total quota of an electronic resource, and a mapping between an amount of the electronic resource and at least one type of behavior data.

The server 101 can be configured to: set an electronic-resource attribute for the web page, to generate a resource message, and send the resource message to the first terminal 102 (that is, a first user corresponding to a first identifier), where the electronic-resource attribute can include the total quota of the electronic resource and electronic resources corresponding to various types of behavior data.

The first terminal 102 can be further configured to: respond to the resource message, and send, to the server 101, a sending request including a receiving contact.

The server 101 can be further configured to: respond to the sending request, and send the web page to the at least one second terminal 103 (for example, a second user corresponding to a second identifier).

Any second terminal 103 can be configured to: detect behavior data generated when the second user performs an operation on the web page, and send an electronic resource obtaining request for the web page to the server 101, where the electronic resource obtaining request can include the first identifier, the second identifier, and the behavior data.

The server 101 can be further configured to: searching for electronic-resource attribute corresponding to the web page according to the first identifier, determine the electronic resource corresponding to the behavior data, and transfer the electronic resource corresponding to the behavior data in an associated account of the first identifier to an associated account of the second identifier.

In this embodiment, the first terminal 102 and the second terminal 103 can include various types of terminal, such as phones, desktop computers, PC computers, and all-in-one machines.

Figure 2:
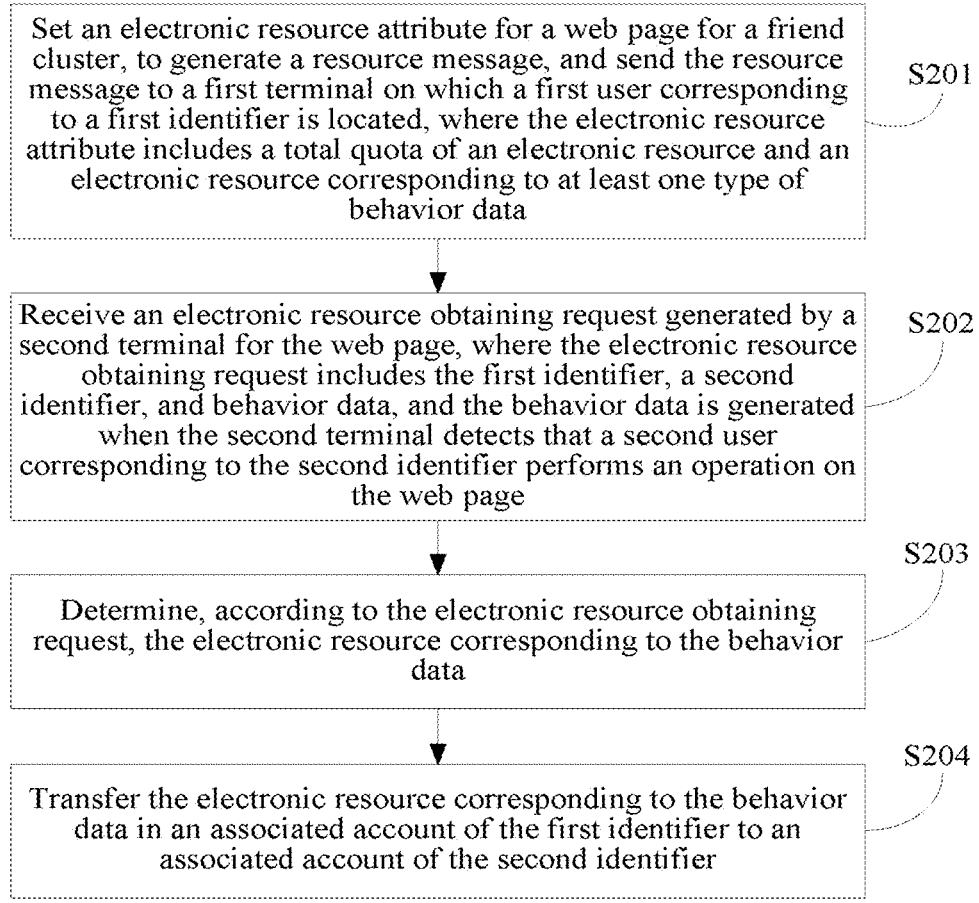
FIG. 2 is a schematic flowchart of a data-processing method according to an embodiment of the present disclosure.

Based on the schematic architectural diagram of the data-processing system shown in FIG. 1, another embodiment of the present disclosure discloses a schematic flowchart of a data-processing method shown in FIG. 2. As shown in FIG. 2, the data-processing method can include the following steps.

In step S201, an electronic-resource attribute for a web page is set for a friend cluster, resulting in the generation a resource message. The resource message can be sent to a first terminal on which a first user having a first identifier is located. The electronic-resource attribute can include a total quota of an electronic resource and an electronic resource corresponding to at least one type of behavior data.

During certain implementations, a server can set the electronic-resource attribute for the web page for the friend cluster according to a preset rule, to generate the resource message, and send the resource message to the first terminal corresponding to the first identifier. The electronic-resource attribute can include the total quota of the electronic resource and the electronic resource corresponding to the at least one type of behavior data. The preset rule can be used for defining a correspondence between the resource message and the electronic-resource attribute. The correspondence can be that one resource message corresponds to one electronic-resource attribute. During certain implementations, the preset rule can be set based on actual demands, for example, can be set according to a budget configured by an enterprise user, or can be set based on that the first identifier can be a communications group account identifier or a personal user account identifier. In this step, the server obtains the electronic-resource attribute corresponding to the resource message according to the preset rule.

In step S202, a request for the web page can be received. The request can be generated by a second terminal, and relates to obtaining an electronic resource. The request to obtain the electronic resource can include the first identifier, a second identifier, and behavior data, and the behavior data can be generated when the second terminal detects that a second user corresponding to the second identifier performs an operation on the web page.

After the first terminal on which the first user is located publishes the web page to the second terminal on which the second user is located by using the friend cluster, the server can receive the electronic resource obtaining request generated by the second terminal for the web page. The behavior data included in the electronic resource obtaining request can be obtained when the terminal detects an operation performed by the second user on the web page. The behavior data can be used for indicating an interaction degree between the second user and the web page. For example, after the first user publishes the web page to the second user by using the friend cluster and the second user performs the operation on the web page, the second terminal can generate the behavior data, and the second terminal can send the behavior data to the server. For another example, after the first user publishes the web page including a preset user interface to the second user by using the friend cluster and the second user performs the operation on the web page, the second terminal can generate the behavior data, and the second user can tap the preset user interface, to submit the electronic resource obtaining request to the server.

In this embodiment, the behavior data can include at least one item of the following data: a display duration of the web page in the second terminal, input data of a comment made by the second user on the web page, data of a voting operation performed by the second user on the web page, data of a sharing operation performed by the second user on the web page, or the like. the behavior data is only an example, and the behavior data includes, but is not limited to the foregoing options. For example, the behavior data can alternatively be data such as a time on which and/or a place in which the user of the second terminal performs an operation on the web page, and is not limited to this embodiment of the present disclosure.

Figure 3C:
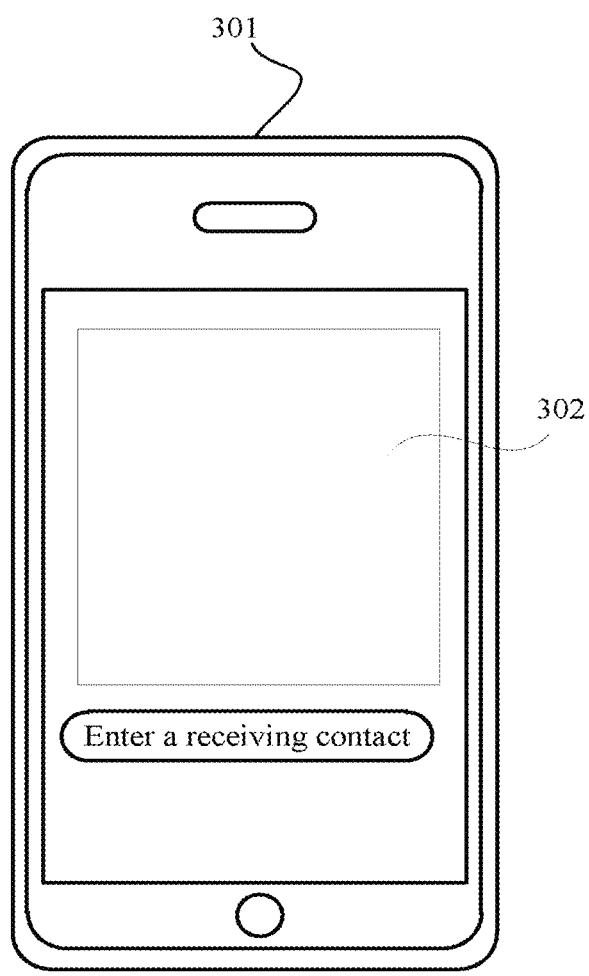
FIG. 3C is a schematic interface diagram of web page transmission according to an embodiment of the present disclosure.

Using a schematic diagram of an interface for web page transmission shown in FIG. 3C as an example, the first user generates, by using a first terminal 301, a web page 302 for advertising a merchant. The web page 302 can include a preset user interface, where the preset user interface can remind the second user to perform an operation on the web page to which the preset user interface belongs, to facilitate collecting a corresponding electronic resource. The first user can enter the quantity of issued electronic resources, a merchant logo, correspondences between different behavior data and the electronic resources, and the like in the preset user interface. After generating the web page 302, the first user can send the web page to the server. Then, the server sets the electronic-resource attribute for the web page for the friend cluster, to generate the resource message, and send the resource message to the first user. The server can remind the first user to enter a receiving contact of the web page 302, that is, the second user receiving the web page. After the first user enters the specified second user receiving the web page, the server can send, to the second user, the web page 302 including the preset user interface.

Figure 3D:
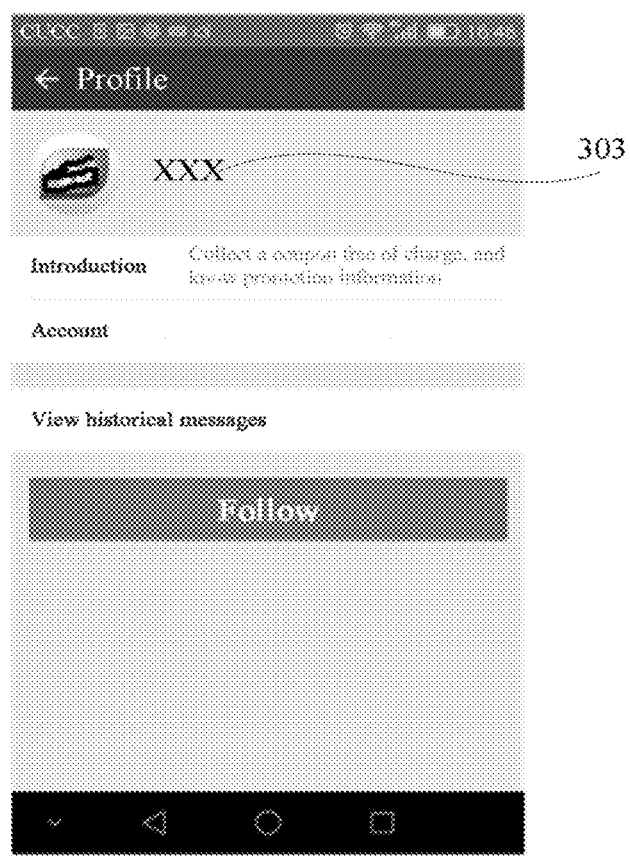
FIG. 3D is a schematic interface diagram of web page transmission according to another embodiment of the present disclosure.

Using a schematic diagram of an interface for web page transmission shown in FIG. 3D as an example, the first user generates a web page for advertising a merchant, where the web page can include a preset user interface. The first user can enter the quantity of issued electronic resources, a merchant logo, and correspondences between different behavior data and the electronic resources in the preset user interface. The first terminal on which the first user is located can send the web page including the preset user interface to WeChat Moments of the first user. The second user can follow the web page according to a WeChat official account 303 of the first user, where the WeChat official account 303 of the first user can be XXX.

For instance, the first terminal on which the first user is located can send the web page including the preset user interface to WeChat Moments of the first user. A third user can follow the web page according to the WeChat official account of the first user, and share the web page in a WeChat Moments of the third user. The second user can search a WeChat Moments of the second user for a WeChat account of the third user, and follow the web page. When detecting an operation performed by the second user on the web page, the behavior data can be generated.

Figure 3E:
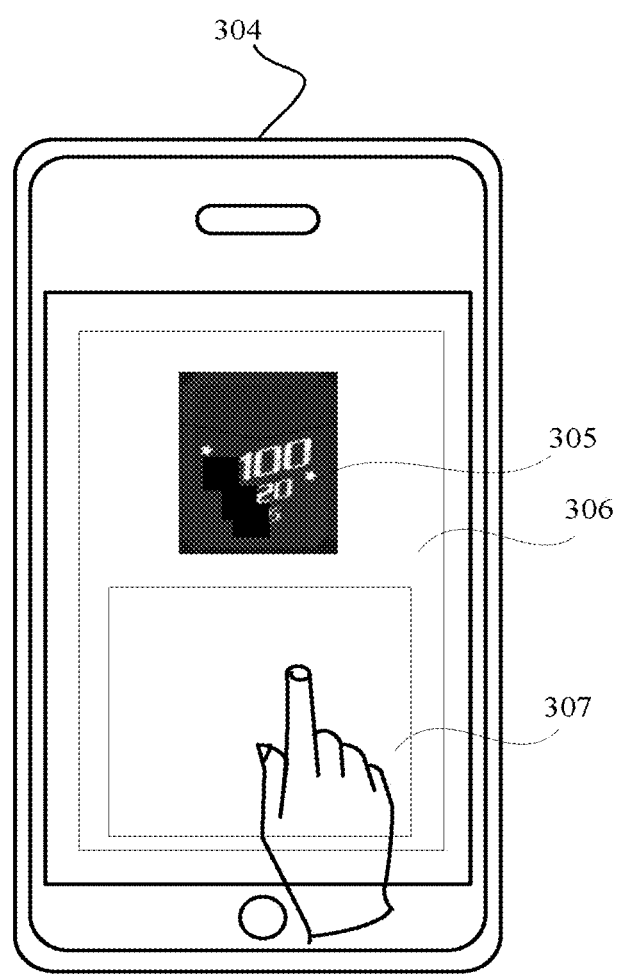
FIG. 3E is a schematic interface diagram of a web page according to an embodiment of the present disclosure.

Using a schematic diagram of an interface for web page transmission in FIG. 3E as an example, after the first user publishes, by using the friend cluster, web page 306 including a preset user interface 305 to a second terminal 304 on which the second user is located, when the second terminal 304 receives a display instruction submitted by the second user on the web page 306, the second terminal 304 can display the web page 306. The web page 306 can be shown in FIG. 3E. The web page 306 can include a preset user interface 305 (for example, discount information such as a gift money packet or a coupon) and advertisement information 307 for advertising a merchant, such as a text, an image, an audio, or a video. The second terminal 304 can collect statistics on a display duration of the web page 306 in the second terminal, that is, a duration from a time on which the second terminal 304 receives the display instruction submitted by the second user on the web page 306 to a time on which the second terminal 304 receives a close instruction submitted by the second user on the web page 306. The display duration of the web page 306 in the second terminal 304 can be used as the behavior data. If the second terminal 304 detects input data of a comment submitted by the second user on the web page 306, the second terminal 304 can use the input data of the comment as the behavior data. If the second terminal 304 detects data of a voting operation performed by the second user on the web page 306, the second terminal 304 can use the data of the voting operation performed by the second user on the web page 306 as the behavior data. If the second terminal 304 detects data of a sharing operation performed by the second user on the web page 306, the second terminal 304 can use the data of the sharing operation performed by the second user on the web page 306 as the behavior data.

Step S203 performs determining the electronic resource corresponding to the behavior data.

After receiving the behavior data sent by the second terminal, the server can determine, according to the electronic-resource attribute, the electronic resource corresponding to the behavior data.

In certain implementations, the server can obtain a time segment to which the display duration of the web page in the terminal belongs, and determine, according to a pre-established correspondence between a time segment and an electronic resource, an electronic resource corresponding to the display duration. For example, the server can establish the correspondence between the time segment and the electronic resource in advance. For instance, when the time segment is [1 min, 5 min], the electronic resource corresponding to the time segment can be a gift money packet with an amount of 2 RMB; or when the time segment is (5 min, 10 min], the electronic resource corresponding to the time segment can be a gift money packet with an amount of 3 RMB. If the terminal detects that the display duration of the web page in the second terminal is 7 min, the server can determine that the time segment to which the duration belongs is (5 min, 10 min], and the electronic resource corresponding to the display duration can be the gift money packet with the amount of 3 RMB.

In certain implementations, the server can obtain the input data of the comment made by the second user on the web page that is detected by the second terminal, determine a comment rating of the second user based on the input data of the comment, and determine, according to a pre-established correspondence between a comment rating and an electronic resource, an electronic resource corresponding to the comment rating. For example, the server can establish the correspondence between the comment rating and the electronic resource in advance. For instance, an electronic resource corresponding to a first comment rating is a red packet with an amount of 10 RMB, an electronic resource corresponding to a second comment rating can be a red packet with an amount of 5 RMB, and so on. After obtaining the input data of the comment made by the second user on the web page, the server can perform evaluation on the input data of the comment. If the comment is rated as a selected comment, the server can obtain that the comment rating of the comment is the first comment rating, and the electronic resource corresponding to the comment can be the red packet with the amount of 10 RMB.

In certain implementations, the server can compare the input data of the comment made by the second user on the web page that is detected by the second terminal with a keyword in a preset keyword database, determine a keyword that is the same as a character in the input data of the comment and that is in the preset keyword database, and determine, according to a pre-established correspondence between a keyword and an electronic resource, the electronic resource corresponding to the keyword the same as the character in the input data of the comment. For example, the server can establish the keyword database in advance. The keyword included in the keyword database can be "XX Bank", "impact", "discount", or the like. After obtaining the input data of the comment made by the second user on the web page, the server can detect whether the input data of the comment includes the keyword. If the comment includes the keyword "XX Bank", the server can determine that the electronic resource corresponding to the comment can be a red packet with an amount of 3 RMB. If the comment includes the keyword "discount", the server can determine that the electronic resource corresponding to the comment can be a red packet with an amount of 2 RMB. For another example, the server can establish the keyword database in advance. The keyword included in the keyword database can be "XX Bank", "impact", "discount", or the like. After obtaining the input data of the comment made by the second user on the web page, the server can detect whether the input data of the comment includes the keyword. When the comment includes any one of the foregoing keywords, the server can determine that the electronic resource corresponding to the comment can be the red packet with the amount of 2 RMB.

In certain implementations, the server can compare the input data of the comment made by the second user on the web page that is detected by the second terminal with a keyword in a preset keyword database, determine a keyword that is the same as a character in the input data of the comment and that is in the preset keyword database, obtain the quantity of the keywords the same as the character in the input data of the comment, and determine, according to a pre-established correspondence between the quantity of keywords and an electronic resource, an electronic resource corresponding to the input data of the comment. For example, the server can detect the quantity of keywords included in the input data of the comment. If the quantity of the keywords included in the input data of the comment is 1, the electronic resource corresponding to the input data of the comment can be a red packet with an amount of 1 RMB; if the quantity of the keywords included in the input data of the comment is 2, the electronic resource corresponding to the input data of the comment can be a red packet with an amount of 2 RMB, and the like.

In certain implementations, the server can obtain the data of the voting operation that is generated when the second user performs the voting operation for the web page and that is detected by the second terminal, determine the quantity of votes based on the data of the voting operation, and determine, according to a pre-established correspondence between the quantity of votes and an electronic resource, an electronic resource corresponding to the quantity of the votes. The server can establish the correspondence between the quantity of the votes and the electronic resource in advance. For example, when the quantity of the votes is [1, 5], the electronic resource corresponding to the quantity of the votes can be a red packet with an amount of 2 RMB; when the quantity of the votes is (5, 10], the electronic resource corresponding to the quantity of the votes can be a red packet with an amount of 3 RMB, and the like. If the quantity of votes by the second user on the web page is 7, the server can determine that the electronic resource corresponding to the quantity of the votes can be the red packet with the amount of 3 RMB. For instance, the server can obtain whether the quantity of the votes by the second user on the web page is greater than the quantity of votes by any user on the web page that is obtained by the server. When the quantity of the votes by the second user on the web page is greater than the quantity of votes by any user on the web page that is obtained by the server, the server can generate the electronic resource corresponding to the quantity of the votes (e.g., a red packet with an amount of 5 RMB).

In certain implementations, the server can obtain the data of the sharing operation performed by the second user on the web page that is detected by the second terminal. Next, the server can determine, based on the data of the sharing operation, a sharing manner in which the second user shares the web page. Third, the server can determine, according to a pre-established correspondence between a sharing manner and an electronic resource, the electronic resource corresponding to the sharing manner. The server can establish the correspondence between the sharing manner and the electronic resource.

For example, when the sharing manner is a WeChat-based sharing manner, the electronic resource corresponding to the sharing manner can be a red packet with an amount of 3 RMB. Further, when the sharing manner is a sharing manner based on "Douban Website," the electronic resource corresponding to the sharing manner can be a red packet with an amount of 2 RMB. If the sharing manner in which the second user shares the web page is the WeChat-based sharing manner, the server can generate the electronic resource corresponding to the sharing manner (e.g., a red packet with the amount of 3 RMB).

In certain implementations, the server obtains the data of the sharing operation performed by the second user on the web page that is detected by the second terminal. Then, the server determines, based on the data of the sharing operation, sharing times when the second user shares the web page. Next, the server determines, according to a pre-established correspondence between sharing times and an electronic resource, the electronic resource corresponding to the sharing times.

For example, the second user can share the web page using three sharing applications (e.g., WeChat, Tencent Microblog, and/or Renren). The server can then obtain that the sharing times of the web page shared by the second user as three respective times, and generate an electronic resource corresponding to the three sharing times.

A manner in which the electronic resource corresponding to the behavior data is determined can include the above non-limiting examples. For example, the behavior data can include input data of the comment performed by a user of the second terminal for the web page. The server can then obtain the input data of the comment made by the second user on the web page. Then, the server can compare the input data of the comment made by the second user on the web page with a keyword in the preset keyword database. Next, the server can determine a keyword that is in the preset keyword database and that is the same as the character in the input data of the comment. Further, the server can determine, according to a pre-established correspondence among a comment rating, a keyword, and an electronic resource, and generate the electronic resource corresponding to the input data of the comment.

For another example, when the behavior data includes the display duration of the web page in the terminal and the data of the voting operation performed by the second user on the web page, the server can determine, according to a pre-established correspondence among a time segment to which a display duration belongs, the quantity of votes, and an electronic resource, the electronic resource corresponding to the behavior data.

In step S204 the electronic resource, which corresponds to the behavior data in an associated account of the first identifier, can be transferred to an associated account of the second identifier.

After determining the electronic resource corresponding to the behavior data, the server can transfer the electronic resource corresponding to the behavior data in the associated account of the first identifier to the associated account of the second identifier. For example, the behavior data is votes by the second user on the web page. The quantity of the votes by the second user on the web page is greater than the quantity of the votes by any user on the web page that is obtained by the server, an amount of a red packet corresponding to the behavior data can be 10 RMB. The server can transfer the electronic resource with an amount of 10 RMB in the associated account of the first identifier to the associated account of the second identifier. The second terminal can display an identifier representing a gift money packet, to remind the second user to collect the gift money packet by performing a specific operation. For another example, the behavior data can be a comment made by the second user on the web page. The comment rating of the comment can be the first comment rating. The electronic resource corresponding to the behavior data can be a Haagen-Dazs coupon of a 20% discount. The server can transfer an electronic resource representing the Haagen-Dazs coupon of the 20% discount in the associated account of the first identifier to the associated account of the second identifier. The second terminal can display the coupon, to remind the second user to collect the coupon.

In certain implementations, before transferring the electronic resource corresponding to the behavior data in the associated account of the first identifier to the associated account of the second identifier, the server can detect whether the second user has a collection right, and when the second user has the collection right, performs the step of transferring the electronic resource corresponding to the behavior data in the associated account of the first identifier to the associated account of the second identifier.

In certain implementations, the server can obtain at least one collection record of the resource message according to a request time of the electronic resource obtaining request, where the collection record can include a collection time and collection quota of an electronic resource. When a sum of the collection quotas included in the at least one collection record does not reach the total quota included in the electronic-resource attribute, it can be determined that the second user has the collection right.

During certain implementations, if the sum of the collection quotas included in the at least one collection record does not reach the total quota included in the electronic-resource attribute, it indicates that the electronic resource described by the resource message is not collected completely, and the second user has the collection right, and can collect the corresponding electronic resource according to the behavior data. On the contrary, if the sum of the collection quotas included in the at least one collection record reaches the total quota included in the electronic-resource attribute, it indicates that the electronic resource described by the resource message is collected completely, and the second user does not have the collection right, and cannot collect the corresponding electronic resource according to the behavior data. In this case, the server can feed back collection failure prompt information to the terminal.

In certain implementations of the present disclosure, an electronic-resource attribute can be set for a web page for a friend cluster, to generate a resource message. The resource message can be sent to a first terminal on which a first user having a first identifier is located, where the electronic-resource attribute can include a total quota of an electronic resource and an electronic resource corresponding to at least one type of behavior data. An electronic resource obtaining request generated by a second terminal for the web page is received. The electronic resource obtaining request can include the first identifier, a second identifier, and behavior data, and the behavior data is generated when the second terminal detects that a second user corresponding to the second identifier performs an operation on the web page. The electronic resource corresponding to the behavior data can be determined according to the electronic resource obtaining request. The electronic resource corresponding to the behavior data can be in an associated account of the first identifier, and can then be transferred to an associated account of the second identifier. Additionally, the corresponding electronic resource can be allocated according to the behavior data, thereby increasing the interactivity between the users.

Figure 4:
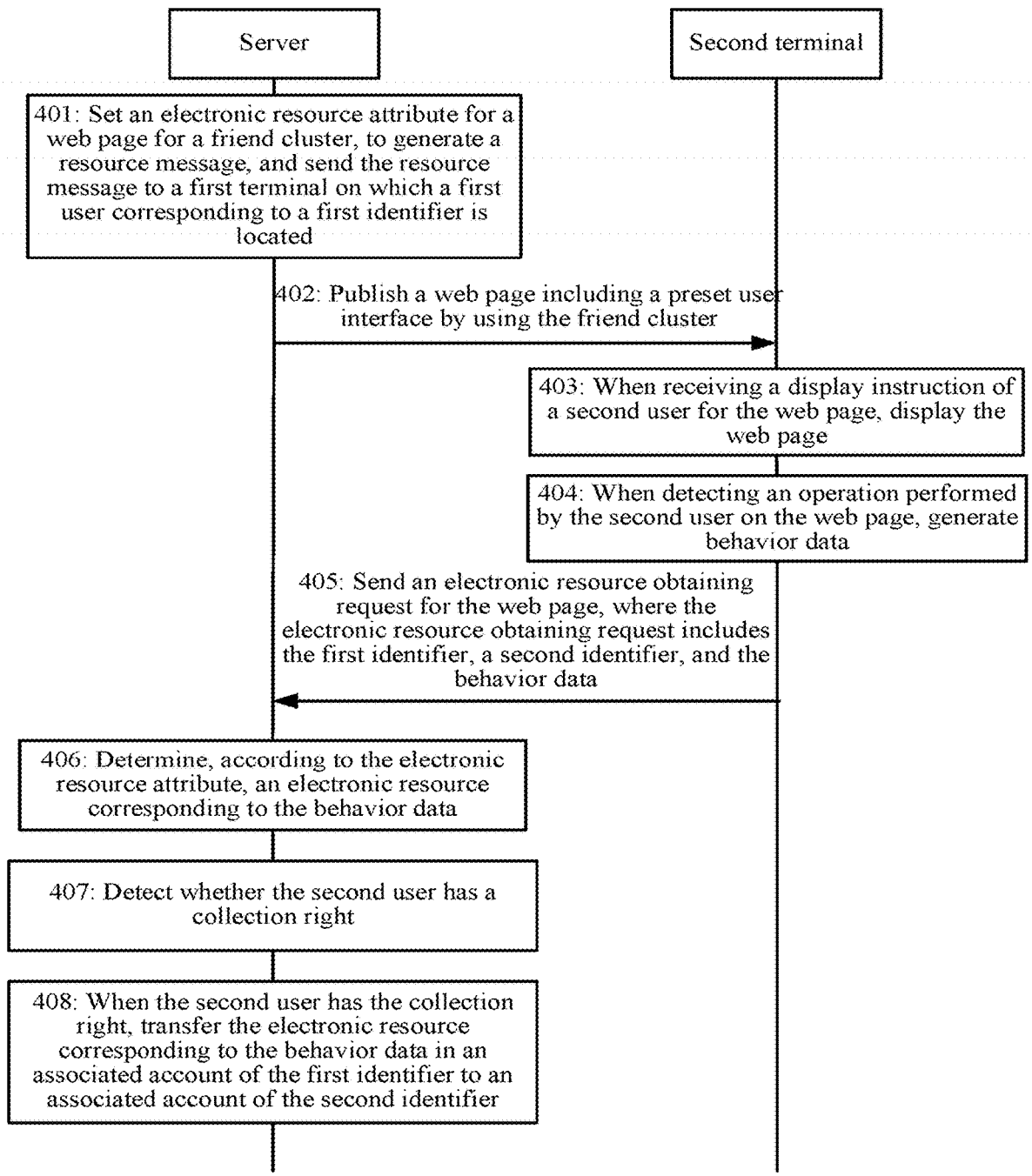
FIG. 4 is a schematic flowchart of a data-processing method according to another embodiment of the present disclosure.

Based on the schematic architectural diagram of the data-processing system shown in FIG. 1, another embodiment of the present disclosure discloses a schematic flowchart of a data-processing method shown in FIG. 4. As shown in FIG. 4, the data-processing method can include the following steps:

S401: A server sets an electronic-resource attribute for a web page for a friend cluster, to generate a resource message, and send the resource message to a first terminal on which a first user having a first identifier is located.

S402: The server publishes a web page including a preset user interface to a corresponding terminal by using the friend cluster.

S403: When receiving a display instruction of a second user on the web page, a second terminal displays the web page.

S404: When detecting an operation performed by the second user on the web page, the second terminal generates behavior data.

S405: The second terminal generates an electronic resource obtaining request for the web page, and sends the electronic resource obtaining request to the server, where the electronic resource obtaining request can include the first identifier, a second identifier, and the behavior data.

S406: The server determines, according to the electronic-resource attribute, the electronic resource corresponding to the behavior data.

S407: The server detects whether the second user has a collection right.

S408: When the second user has the collection right, the server transfers the electronic resource corresponding to the behavior data in an associated account of the first identifier to an associated account of the second identifier.

Accordingly, the server sets an electronic-resource attribute for a web page for a friend cluster, to generate a resource message, and sends the resource message to the first terminal on which a first user having a first identifier is located. When receiving a display instruction of a second user on the web page, the second terminal displays the web page. When detecting an operation performed by the second user on the web page, the second terminal generates behavior data and sends the behavior data to the server. The server determines, according to the electronic-resource attribute, the electronic resource corresponding to the behavior data. When the second user has a collection right, the server transfers the electronic resource corresponding to the behavior data in an associated account of the first identifier to an associated account of the second identifier. Therefore, the corresponding electronic resource can be allocated according to the behavior data, thereby increasing the interactivity between the first user and the second user.

Figure 5:
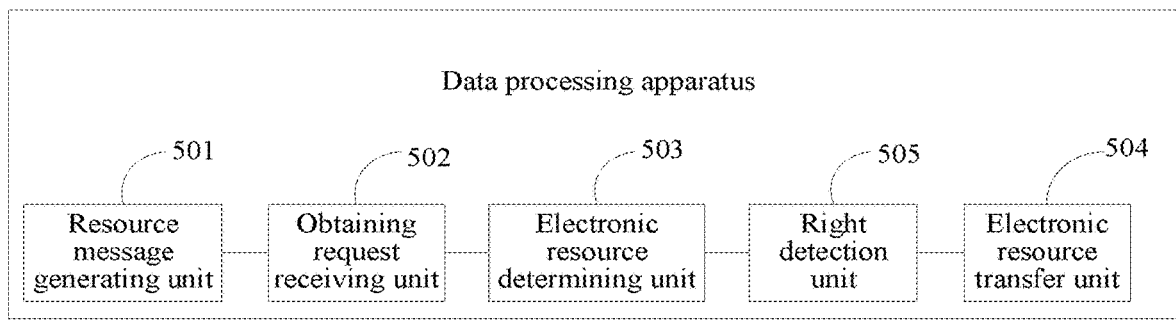
FIG. 5 is a schematic structural diagram of a data-processing apparatus according to an embodiment of the present disclosure.

FIG. 5 shows a non-limiting example of a schematic structural diagram of a data-processing apparatus according to an embodiment of the present disclosure. The data-processing apparatus in this embodiment of the present disclosure can be applied in a server. As shown in the figure, the data-processing apparatus in this embodiment can include at least a resource message generating unit 501, an obtaining request receiving unit 502, an electronic resource determining unit 503, and an electronic resource transfer unit 504.

The resource message generating unit 501 is configured to set an electronic-resource attribute for a web page for a friend cluster. The resource message generating unit 501 generates a resource message, and sends the resource message to a first terminal on which a first user having a first identifier is located. The electronic-resource attribute can include a total quota of an electronic resource and an electronic resource corresponding to at least one type of behavior data.

The obtaining request receiving unit 502 is configured to receive an electronic resource obtaining request generated by a second terminal for the web page. The electronic resource obtaining request can include the first identifier, a second identifier, and behavior data. The behavior data is generated when the second terminal detects that a second user corresponding to the second identifier performs an operation on the web page.

The electronic resource determining unit 503 can be configured to determine, according to the electronic resource obtaining request received by the obtaining request receiving unit 502, the electronic resource corresponding to the behavior data.

The electronic resource transfer unit 504 can be configured to transfer the electronic resource corresponding to the behavior data that is in an associated account of the first identifier and that is determined by the electronic resource determining unit 503 to an associated account of the second identifier.

The behavior data can include at least one of: a display duration of the web page in the second terminal; input data of a comment made by the second user on the web page; data of a voting operation performed by the second user on the web page; and data of a sharing operation performed by the second user on the web page.

In certain implementations, the electronic resource determining unit 503 can be configured to obtain a time segment to which the display duration of the web page in the terminal belongs; and determine, according to a pre-established correspondence between a time segment and an electronic resource, the electronic resource corresponding to the time segment to which the display duration belongs.

In certain implementations, the electronic resource determining unit 503 can be configured to obtain the input data of the comment made by the second user on the web page, and determine a comment rating of the comment based on the input data of the comment; and determine, according to a pre-established correspondence between a comment rating and an electronic resource, the electronic resource corresponding to the comment rating.

In certain implementations, the electronic resource determining unit 503 can be configured to compare the input data of the comment made by the second user on the web page with a keyword in a preset keyword database; determine a keyword that is in the preset keyword database and that is the same as a character in the input data of the comment; and determine, according to a pre-established correspondence between a keyword and an electronic resource, the electronic resource corresponding to the keyword that is the same as the character in the input data of the comment.

In certain implementations, the electronic resource determining unit 503 can be configured to obtain the data of the voting operation performed by the second user on the web page, and determine the quantity of votes in the voting that corresponds to the data of the voting operation; and determine, according to a pre-established correspondence between the quantity of votes and an electronic resource, the electronic resource corresponding to the quantity of votes.

In certain implementations, the electronic resource determining unit 503 can be configured to obtain the data of the sharing operation performed by the second user on the web page, determine a sharing manner of the sharing based on the data of the sharing operation; and determine, according to a pre-established correspondence between a sharing manner and an electronic resource, the electronic resource corresponding to the sharing manner.

In an implementation, the data-processing apparatus can further include a right detection unit 505, configured to: before the electronic resource transfer unit 504 transfers the electronic resource corresponding to the behavior data in the associated account of the first identifier to the associated account of the second identifier, detect whether the second user has a collection right. Further, the electronic resource transfer unit 504 can be configured to, when the right detection unit 505 determines that the second user has the collection right, transfer the electronic resource corresponding to the behavior data in the associated account of the first identifier to the associated account of the second identifier.

In certain implementations, the right detection unit 505 can be configured to obtain at least one collection record of the resource message according to a request time of the electronic resource obtaining request, where the collection record can include a collection time and collection quota of the electronic resource. Further, the electronic resource transfer unit 504 can be configured to, determine, when a sum of the collection quota included in the at least one collection record does not reach the total quota included in the electronic-resource attribute, that the second user has the collection right.

In certain implementations, the web page can include a preset user interface. The preset user interface can be configured to remind the second user to perform an operation on the web page, to collect a corresponding electronic resource.

Accordingly, the resource message generating unit 501 sets an electronic-resource attribute for a web page for a friend cluster, to generate a resource message, and sends the resource message to the first terminal on which a first user having a first identifier is located, where the electronic-resource attribute can include a total quota of an electronic resource and an electronic resource corresponding to at least one type of behavior data; the obtaining request receiving unit 502 receives an electronic resource obtaining request that is generated by the second terminal for the web page, where the electronic resource obtaining request can include the first identifier, a second identifier, and behavior data, where the behavior data is generated when the second terminal detects a second user corresponding to the second identifier performs an operation on the web page; the electronic resource determining unit 503 determines, according to the electronic resource obtaining request, the electronic resource corresponding to the behavior data; the electronic resource transfer unit 504 transfers the electronic resource corresponding to the behavior data in an associated account of the first identifier to an associated account of the second identifier, thereby increasing the interactivity between the first user and the second user.

Figure 6:
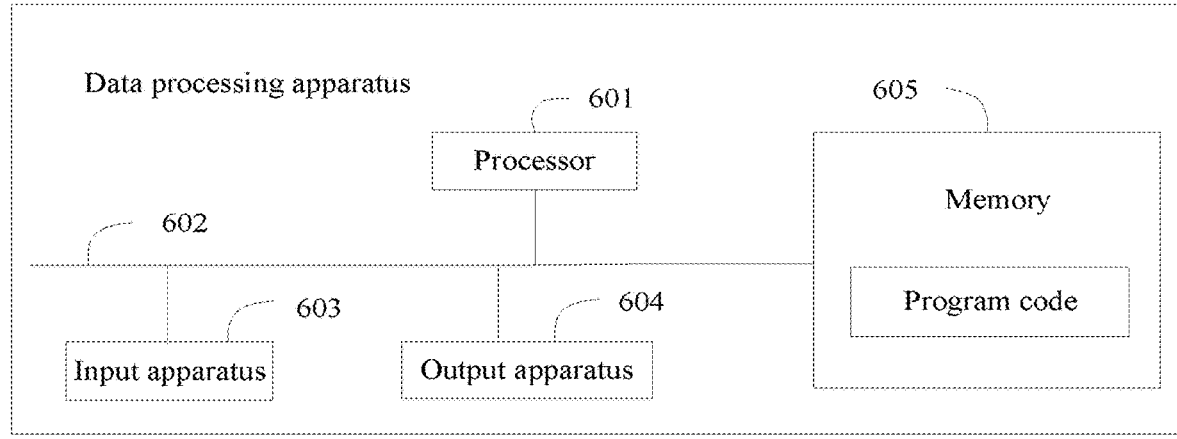
FIG. 6 is a schematic diagram of a hardware structure of a data-processing apparatus according to an embodiment of the present disclosure.

FIG. 6 shows a non-limiting example a schematic diagram of a hardware structure of a data-processing apparatus according to an embodiment of the present disclosure. The data-processing apparatus provided in this embodiment of the present disclosure can be configured to implement the methods in the embodiments shown in FIG. 2 and FIG. 4 of the present disclosure. For ease of description, only a part related to the embodiments of the present disclosure is shown. For specific technical details that are not disclosed, refer to the embodiments shown in FIG. 2 and FIG. 4 of the present disclosure.

When the data-processing apparatus provided in the foregoing embodiment performs data processing, only divisions of the foregoing program modules are described by using an example. During actual application, the foregoing processing can be allocated to and completed by different program modules according to requirements, that is, the internal structure of the apparatus can be divided into different program modules, to complete all or some of the foregoing described processing. In addition, the data-processing apparatus provided in the foregoing embodiment belongs to the same concept as the embodiment of the data-processing method. For a certain implementations process of the apparatus, refer to the method embodiment, and details are not described herein again.

As shown in FIG. 6, the data-processing apparatus can include at least one processor 601, at least one input apparatus 603, at least one output apparatus 604, and a memory 605. Communication connection among the at least one processor 601, the at least one input apparatus 603, the at least one output apparatus 604, and the memory 605 can be implemented by using at least one communications bus 602. The input apparatus 603 can be a network interface or the like, and can be configured to receive behavior data sent by a second terminal. The output apparatus 604 can be a network interface or the like, and can be configured to send a resource message to a first terminal on which a first user having a first identifier is located.

The memory 605 can be implemented by using any type of volatile or non-volatile storage device or a combination thereof. The non-volatile memory can be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or an optical disc read-only memory (CD-ROM). The magnetic surface memory a magnetic disk memory or a magnetic tape memory. The volatile memory can be a random access memory (RAM), and is used as an external cache. In one non-limiting example, RAMs in multiple forms are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct Rambus random access memory (DRRAM). The memory 605 described in this embodiment of the present disclosure is intended to include, but not be limited to, the memories and any suitable type of memory.

In this embodiment, the memory 605 can include at least one storage apparatus distant from the processor 601. The processor 601 can be combined with the data-processing apparatus shown in FIG. 5. The memory 605 stores a group of computer programs, and when the processor 601 executes the group of computer programs it causes the processor 601 to perform:

setting an electronic-resource attribute for a web page for a friend cluster, to generate a resource message, and sending the resource message to a first terminal on which a first user having a first identifier is located, where the electronic-resource attribute can include a total quota of an electronic resource and an electronic resource corresponding to at least one type of behavior data;

receiving an electronic resource obtaining request generated by a second terminal for the web page, where the electronic resource obtaining request can include the first identifier, a second identifier, and behavior data, and the behavior data is generated when the second terminal detects that a second user corresponding to the second identifier performs an operation on the web page;

determining, according to the electronic resource obtaining request, the electronic resource corresponding to the behavior data; and transferring the electronic resource corresponding to the behavior data in an associated account of the first identifier to an associated account of the second identifier.

The behavior data can include at least one item of: a display duration of the web page in the second terminal; input data of a comment made by the second user on the web page; data of a voting operation performed by the second user on the web page; and data of a sharing operation performed by the second user on the web page.

In certain implementations, when the processor 601 can be configured to run the computer programs, the following operations are performed:

obtaining a time segment to which the display duration of the web page in the terminal belongs; and determining, according to a pre-established correspondence between a time segment and an electronic resource, the electronic resource corresponding to the time segment to which the display duration belongs.

In certain implementations, when the processor 601 can be configured to run the computer programs, the following operations are performed:

obtaining the input data of the comment made by the second user on the web page, and determining a comment rating of the comment based on the input data of the comment; and determining, according to a pre-established correspondence between a comment rating and an electronic resource, the electronic resource corresponding to the comment rating.

In certain implementations, when the processor 601 can be configured to run the computer programs, the following operations are performed:

comparing the input data of the comment made by the second user on the web page with a keyword in a preset keyword database;

determining a keyword that is in the preset keyword database and that is the same as a character in the input data of the comment; and determining, according to a pre-established correspondence between a keyword and an electronic resource, the electronic resource corresponding to the keyword that is the same as the character in the input data of the comment.

In certain implementations, when the processor 601 can be configured to run the computer programs, the following operations are performed:

obtaining the data of the voting operation performed by the second user on the web page, and determining the quantity of votes in the voting that corresponds to the data of the voting operation; and determining, according to a pre-established correspondence between the quantity of votes and an electronic resource, the electronic resource corresponding to the quantity of votes.

In certain implementations, when the processor 601 can be configured to run the computer programs, the following operations are performed:

obtaining the data of the sharing operation performed by the second user on the web page, determining a sharing manner of the sharing based on the data of the sharing operation; and determining, according to a pre-established correspondence between a sharing manner and an electronic resource, the electronic resource corresponding to the sharing manner.

In certain implementations, when the processor 601 can be configured to run the computer programs, the following operations are performed:

detecting, before the electronic resource corresponding to the behavior data in the associated account of the first identifier is transferred to the associated account of the second identifier, whether the second user has a collection right; and transferring, when the second user has the collection right, the electronic resource corresponding to the behavior data in the associated account of the first identifier to the associated account of the second identifier.

In certain implementations, when the processor 601 can be configured to run the computer programs, the following operations are performed:

obtaining at least one collection record of the resource message according to a request time of the electronic resource obtaining request, where the collection record can include a collection time and collection quota of the electronic resource; and determining, when a sum of the collection quotas included in the at least one collection record does not reach the total quota included in the electronic-resource attribute, that the second user has the collection right.

For example, the terminals described in this embodiment of the present disclosure can be configured to implement a part of or all of processes in the method embodiments shown in FIG. 2 and FIG. 4.

An embodiment of the present disclosure also provides a computer storage medium, for example, the memory 605 including the computer programs. The computer programs can be executed by the processor 601 of the data-processing apparatus, to perform the steps of the foregoing method. The computer storage medium can be a memory, such as an FRAM, a ROM, a PROM, an EPROM, an EEPROM, a flash memory, a magnetic surface memory, an optical disc, or a CD-ROM; or can be any device including any one of the memories or any combination, such as a mobile phone, a computer, a tablet computer, or a personal digital assistant.

A computer readable storage medium provided in this embodiment of the present disclosure stores computer programs. When the computer programs are executed by the processor, the following operations are performed:

setting an electronic-resource attribute for a web page for a friend cluster, to generate a resource message, and sending the resource message to a first terminal on which a first user having a first identifier is located, where the electronic-resource attribute can include a total quota of an electronic resource and an electronic resource corresponding to at least one type of behavior data;

receiving an electronic resource obtaining request generated by a second terminal for the web page, where the electronic resource obtaining request can include the first identifier, a second identifier, and behavior data, and the behavior data is generated when the second terminal detects that a second user corresponding to the second identifier performs an operation on the web page;

determining, according to the electronic resource obtaining request, the electronic resource corresponding to the behavior data; and transferring the electronic resource corresponding to the behavior data in an associated account of the first identifier to an associated account of the second identifier.

The behavior data can include at least one item of the following data: a display duration of the web page in the second terminal; input data of a comment made by the second user on the web page; data of a voting operation performed by the second user on the web page; or data of a sharing operation performed by the second user on the web page.

In an implementation, when the computer programs are executed by the processor, the following operations are performed: obtaining a time segment to which the display duration of the web page in the terminal belongs; and determining, according to a pre-established correspondence between a time segment and an electronic resource, the electronic resource corresponding to the time segment to which the display duration belongs.

In an implementation, when the computer programs are executed by the processor, the following operations are performed: obtaining the input data of the comment made by the second user on the web page, and determining a comment rating of the comment based on the input data of the comment; and determining, according to a pre-established correspondence between a comment rating and an electronic resource, the electronic resource corresponding to the comment rating.

In an implementation, when the computer programs are executed by the processor, the following operations are performed: comparing the input data of the comment made by the second user on the web page that is detected by the second terminal with a keyword in a preset keyword database; determining a keyword that is the same as a character in the input data of the comment and that is in the preset keyword database; and determining, according to a pre-established correspondence between a keyword and an electronic resource, the electronic resource corresponding to the keyword the same as the character in the input data of the comment.

In an implementation, when the computer programs are executed by the processor, the following operations are performed: obtaining the data of the voting operation performed by the second user on the web page, and determining the quantity of votes that corresponds to the data of the voting operation; and determining, according to a pre-established correspondence between the quantity of votes and an electronic resource, the electronic resource corresponding to the quantity of votes.

In an implementation, when the computer programs are executed by the processor, the following operations are performed: obtaining the data of the sharing operation performed by the second user on the web page, determining a sharing manner of the sharing based on the data of the sharing operation; and determining, according to a pre-established correspondence between a sharing manner and an electronic resource, the electronic resource corresponding to the sharing manner.

In an implementation, when the computer programs are executed by the processor, the following operations are performed: before the electronic resource corresponding to the behavior data in the associated account of the first identifier can be transferred to the associated account of the second identifier, detecting whether the second user has a collection right; and when the second user has the collection right, transferring the electronic resource corresponding to the behavior data in the associated account of the first identifier to the associated account of the second identifier.

In an implementation, when the computer programs are executed by the processor, the following operations are performed: obtaining at least one collection record of the resource message according to a request time of the electronic resource obtaining request, where the collection record can include a collection time and collection quota of an electronic resource; and when a sum of the collection quotas included in the at least one collection record does not reach the total quota included in the electronic-resource attribute, determining that the second user has the collection right.

In the several embodiments provided in the present disclosure, it should be understood that the disclosed method and apparatus can be implemented in other manners. The described apparatus embodiments are merely exemplary. For example, the module division can be merely logical function division and can be other division during actual implementation. For example, multiple modules or components can be combined or integrated into another system, or some features can be ignored or not performed. In addition, the displayed or discussed communication connections between the components can be implemented through some interfaces, indirect couplings or communication connections between the devices or modules, or electrical connections, mechanical connections, or connections in other forms.

The modules described as separation parts can be or might not be physically separated. The part displayed as a module can be or might not be a physical module. That is, the modules can be located in a same place, or can be distributed to many network modules. Some or all of the modules need to be selected according to actual requirements to implement the purpose of the solution of the embodiments.

In addition, the functional modules in the embodiments of the present disclosure can be all integrated in a processing module, each module can be separately used as a module, or two or more modules are integrated in a module. The integrated module can be implemented in a form of hardware, or can be implemented in a form of hardware plus a software functional module.

A person of ordinary skill in the art should understand that all or a part of the steps of the method according to the embodiments of the present disclosure can be implemented by a program instructing relevant hardware. The program can be stored in a computer readable storage medium. When the program is run, the steps of the method according to the embodiments of the present disclosure are performed. The storage medium can be any medium that is capable of storing program code, such as a portable storage device, a ROM, a magnetic disk, or an optical disc.

Alternatively, in the embodiments of the present disclosure, if implemented in the form of software functional modules and sold or used as independent products, the integrated modules can be stored in a computer-readable storage medium. Based on such an understanding, the technical solutions of the embodiments of the present disclosure essentially, or the part contributing to the related technology can be implemented in a form of a software product. The computer software product is stored in a storage medium and can include several instructions for instructing a computer device (which can be a personal computer, a server, a network device, or the like) to perform all or some of the methods described in the embodiments of the present disclosure. The foregoing storage medium can include, e.g., any media that can store program code, such as a portable storage device, a ROM, a magnetic disk, or an optical disc.

While certain implementations and embodiments have been described, these implementations and embodiments have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

For the data-processing method and apparatus described herein, the foregoing embodiments are provided as non-limiting examples, and are not intended to limit the teachings of this disclosure. A person of ordinary skill in the art should understand that, modifications can be made to the technical solutions described in the foregoing embodiments, or equivalent replacements can be made to some or all of technical features in the technical solutions, as long as such modifications or replacements do not cause the essence of corresponding technical solutions to depart from the scope of technical solutions in the embodiments of the present disclosure.

The foregoing descriptions are merely preferred embodiments, but are not intended to limit the protection scope of the present disclosure.

INDUSTRIAL PRACTICABILITY

According to the technical solutions in the embodiments of the present disclosure, an electronic-resource attribute is set for a web page for a friend cluster, to generate a resource message; the resource message is sent to a first terminal on which a first user having a first identifier is located, where the electronic-resource attribute can include a total quota of an electronic resource and an electronic resource corresponding to at least one type behavior data; an electronic resource obtaining request generated by a second terminal for the web page is received, where the electronic resource obtaining request can include the first identifier, a second identifier, and behavior data, and the behavior data is generated when the second terminal detects that a second user corresponding to the second identifier performs an operation on the web page; the electronic resource corresponding to the behavior data is determined according to the electronic resource obtaining request; and the electronic resource corresponding to the behavior data in an associated account of the first identifier is transferred to an associated account of the second identifier. According to the embodiments of the present disclosure, a corresponding electronic resource can be allocated according to behavior data of a user, thereby increasing the interactivity between the first user and the second user.

What is claimed is:

1. A data-processing method, the method comprising:
setting, in a web page of a friend cluster, an electronic-resource attribute that causes a resource message to be generated, the electronic-resource attribute including a total quota of an electronic resource and a mapping between an amount of the electronic resource and at least one type of behavior data;
sending the resource message to a first terminal of a first user, the first user having a first identifier;
receiving, from a second terminal for the web page, an electronic-resource request for a second user that uses the second terminal to obtain the electronic resource, the electronic-resource request including the first identifier, a second identifier of the second user, and behavior data, and the behavior data being generated based on an operation on the web page performed by the second user;
determining, by processing circuitry of an information processing apparatus and in accordance with the mapping between the amount of the electronic resource and the at least one type of behavior data, the amount of the electronic resource corresponding to the behavior data of the electronic-resource request; and
transferring, from an associated account of the first identifier to an associated account of the second identifier, the determined amount of the electronic resource corresponding to the behavior data.

2. The method according to claim 1, wherein the behavior data comprises one or more of:
a display duration of the web page in the second terminal,
input data of a comment made by the second user on the web page,
data of a voting operation performed by the second user on the web page, and
data of a sharing operation performed by the second user on the web page.

3. The method according to claim 2, wherein, when the behavior data includes the display duration of the web page in the second terminal, the determining of the amount of the electronic resource corresponding to the behavior data of the electronic-resource request further includes
obtaining a time segment to which the display duration of the web page in the second terminal belongs, and
determining, according to a pre-established correspondence between time segments and the amount of the electronic resource, the amount of the electronic resource corresponding to the time segment to which the display duration belongs.

4. The method according to claim 2, wherein, when the behavior data includes the input data of the comment made by the second user on the web page, the determining of the amount of the electronic resource corresponding to the behavior data of the electronic-resource request further includes
obtaining the input data of the comment made by the second user on the web page, and determining a comment rating of the comment based on the input data of the comment, and
determining, according to a pre-established correspondence between comment ratings and the amount of the electronic resource, the amount of the electronic resource corresponding to the comment rating.

5. The method according to claim 2, wherein, when the behavior data includes the input data of the comment made by the second user on the web page, the determining of the amount of the electronic resource corresponding to the behavior data of the electronic-resource request further includes
comparing the input data of the comment made by the second user on the web page with a keyword in a preset keyword database,
determining a keyword of the preset keyword database and that is synonymous with or analogous to one or more words in the input data of the comment, and
determining, according to a pre-established correspondence between keywords of the preset keyword database and the amount of the electronic resource, the amount of the electronic resource corresponding to the keyword that is synonymous with or analogous to the one or more words in the input data of the comment.

6. The method according to claim 2, wherein, when the behavior data includes the data of the voting operation performed by the second user on the web page, the determining of the amount of the electronic resource corresponding to the behavior data of the electronic-resource request further includes obtaining the data of the voting operation performed by the second user on the web page, determining a quantity of votes cast by the second user during the voting operation, and determining, according to a pre-established correspondence between quantities of votes and the amount of the electronic resource, the amount of the electronic resource corresponding to the quantity of votes.

7. The method according to claim 2, wherein, when the behavior data includes the data of the voting operation performed by the second user on the web page, the determining of the amount of the electronic resource corresponding to the behavior data of the electronic-resource request further includes obtaining the data of the sharing operation performed by the second user on the web page, determining, based on the data of the sharing operation, a manner in which sharing was performed, and determining, according to a pre-established correspondence between manners in which the sharing can be performed and the amount of the electronic resource, the amount of the electronic resource corresponding to the determined manner in which the sharing was performed.

8. The method according to claim 1, further comprising, detecting whether the second user has a collection right, prior to the transferring of the amount of the electronic resource corresponding to the behavior data; and performing the transferring of the amount of the electronic resource corresponding to the behavior data, when the second user is detected to have the collection right.

9. The method according to claim 8, wherein the detecting whether the second user has the collection right further includes obtaining at least one collection record of the resource message according to a request time of the electronic resource request, wherein the collection record comprises a collection time and collection quota of the electronic resource, and determining that the second user has the collection right, upon a sum of the collection quota comprised in the at least one collection record being determined to not reach the total quota of the electronic-resource attribute.

10. The method according to claim 1, wherein the web page comprises a preset user interface, and the preset user interface is configured to signal the second user to perform the operation on the web page, which allows for obtaining the electronic resource.

11. A data-processing apparatus, comprising:

processing circuitry configured to set, in a web page of a friend cluster, an electronic-resource attribute that causes a resource message to be generated, the electronic-resource attribute comprising a total quota of an electronic resource and a mapping between an amount of the electronic resource and at least one type of behavior data, send the resource message to a first terminal of a first user, the first user having a first identifier, receive, from a second terminal for the web page, an electronic-resource request for a second user that uses the second terminal to obtain the electronic resource, the electronic-resource request comprising the first identifier, a second identifier of the second user, and behavior data, and the behavior data being generated based on an operation on the web page performed by the second user, determine, in accordance with the mapping between the amount of the electronic resource and the at least one type of behavior data, the amount of the electronic resource corresponding to the behavior data of the electronic-resource request, and transfer, from an associated account of the first identifier to an associated account of the second identifier, the determined amount of the electronic resource corresponding to the behavior data.

12. The apparatus according to claim 11, wherein the processing circuitry is further configured to receive in the electronic-resource request the behavior data, wherein the behavior data comprises one or more of a display duration of the web page in the second terminal, input data of a comment made by the second user on the web page, data of a voting operation performed by the second user on the web page, and data of a sharing operation performed by the second user on the web page.

13. The apparatus according to claim 12, wherein the processing circuitry is further configured to obtain a time segment to which the display duration of the web page in the second terminal belongs, and determine, according to a pre-established correspondence between a time segments and the amount of the electronic resource, the amount of the electronic resource corresponding to the time segment to which the display duration belongs.

14. The apparatus according to claim 12, wherein the processing circuitry is further configured to obtain the input data of the comment made by the second user on the web page, determine a comment rating of the comment based on the input data of the comment, and determine, according to a pre-established correspondence between a comment ratings and the amount of the electronic resource, the amount of the electronic resource corresponding to the comment rating.

15. The apparatus according to claim 12, wherein the processing circuitry is further configured to compare the input data of the comment made by the second user on the web page with a keyword in a preset keyword database;

determine a keyword of the preset keyword database and that is synonymous with or analogous to one or more words in the input data of the comment, and determine, according to a pre-established correspondence between keywords of the preset keyword database and the amount of the electronic resource, the amount of the electronic resource corresponding to the keyword that is synonymous with or analogous to the one or more words in the input data of the comment.

16. The apparatus according to claim 12, wherein the processing circuitry is further configured to obtain the data of the voting operation performed by the second user on the web page, determining a quantity of votes cast by the second user during the voting operation, and determine, according to a pre-established correspondence between quantities of votes and the amount of the electronic resource, the amount of the electronic resource corresponding to the quantity of votes.

17. The apparatus according to claim 12, wherein the processing circuitry is further configured to
obtain the data of the sharing operation performed by the second user on the web page,
determine, based on the data of the sharing operation, a manner in which sharing was performed, and
determine, according to a pre-established correspondence between manners in which the sharing can be performed and the amount of the electronic resource, the amount of the electronic resource corresponding to the determined manner in which the sharing was performed.

18. The apparatus according to claim 11, wherein the processing circuitry is further configured to
detect whether the second user has a collection right, prior to transferring the amount of the electronic resource corresponding to the behavior data, and
perform the transfer of the amount of the electronic resource corresponding to the behavior data, when the second user is detected to have the collection right.

19. The apparatus according to claim 18, wherein the processing circuitry is further configured to detect whether the second user has the collection right by being configured to:
obtain at least one collection record of the resource message according to a request time of the electronic resource request, wherein the collection record comprises a collection time and collection quota of the electronic resource, and
determine that the second user has the collection right, upon a sum of the collection quota comprised in the at least one collection record being determined to not reach the total quota of the electronic-resource attribute.

20. The apparatus according to claim 11, wherein the web page comprises a preset user interface, and the preset user interface is configured to remind the second user to perform an operation on the web page, to collect a corresponding electronic resource.

21. A non-transitory computer storage medium storing instructions which when executed by at least one processor cause the at least one processor to perform:
setting, in a web page of a friend cluster, an electronic-resource attribute that causes a resource message to be generated, the electronic-resource attribute including a total quota of an electronic resource and a mapping between an amount of the electronic resource and at least one type of behavior data;
sending the resource message to a first terminal of a first user, the first user having a first identifier;
receiving, from a second terminal for the web page, an electronic-resource request for a second user that uses the second terminal to obtain the electronic resource, the electronic-resource request including the first identifier, a second identifier of the second user, and behavior data, and the behavior data being generated based on an operation on the web page performed by the second user;
determining, in accordance with the mapping between the amount of the electronic resource and the at least one type of behavior data, the amount of the electronic resource corresponding to the behavior data of the electronic-resource request; and
transferring, from an associated account of the first identifier to an associated account of the second identifier, the determined amount of the electronic resource corresponding to the behavior data.

\* \* \* \* \*